United States Patent
Kunieda et al.

(10) Patent No.: US 10,281,038 B2
(45) Date of Patent: May 7, 2019

(54) ACTUATOR FOR SHIFT BY WIRE AUTOMATIC TRANSMISSION

(71) Applicant: AISIN SEIKI KABUSHIKI KAISHA, Kariya-shi, Aichi-ken (JP)

(72) Inventors: Kenji Kunieda, Seto (JP); Keiji Suzumura, Toyota (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/703,359

(22) Filed: Sep. 13, 2017

(65) Prior Publication Data
US 2018/0142784 A1    May 24, 2018

(30) Foreign Application Priority Data

Nov. 18, 2016 (JP) .................................. 2016-225186

(51) Int. Cl.
  *F16H 63/34* (2006.01)
  *F16H 61/32* (2006.01)
  *F16H 59/04* (2006.01)

(52) U.S. Cl.
  CPC ......... *F16H 63/3466* (2013.01); *F16H 61/32* (2013.01); *F16H 59/044* (2013.01); *F16H 2061/326* (2013.01)

(58) Field of Classification Search
  CPC .... F16H 61/28; F16H 61/32; F16H 2061/326; F16H 63/3458; F16H 63/3466; H01H 2300/02

(Continued)

(56) References Cited

U.S. PATENT DOCUMENTS 5,777,471 A * 7/1998 Stoll ...................... G01D 5/145
                                                          324/174
6,399,941 B1 * 6/2002 Nakagaki ................ G01C 9/12
                                                          200/61.45 R (Continued)

FOREIGN PATENT DOCUMENTS

| EP | 0 928 910 A1 | 7/1999 | |
| JP | 2008-223813 A | 9/2008 | |
| JP | 2016033387 A * | 3/2016 | ............. F16H 61/32 |

OTHER PUBLICATIONS

The extended European Search Report dated Apr. 12, 2018, by the European Patent Office in corresponding European Patent Application No. 17190891.6-1012. (9 pages).

*Primary Examiner* — Victor L MacArthur
*Assistant Examiner* — Bobby Rushing, Jr.
(74) *Attorney, Agent, or Firm* — Buchanan Ingersoll & Rooney PC

(57) ABSTRACT

An actuator is applied to a shift by wire automatic transmission that operates in response to an electric signal output in accordance with an operation state of an operation member and that performs switching to a selected shift range, and rotates a control shaft provided in the automatic transmission about an axis line. The actuator includes: a case including an insertion hole through which the control shaft is inserted; a motor generating a driving force; gears contained in the case and transmitting the driving force to the control shaft; and an output shaft disposed coaxially with the insertion hole between the gears and the control shaft in the case, the output shaft allowing the control shaft to be inserted through the output shaft such that the control shaft is movable in a direction of the axis line and is rotatable about the axis line integrally with the output shaft.

3 Claims, 3 Drawing Sheets

(58) Field of Classification Search
USPC ....... 74/473.12, 473.36; 403/354, 359.1, 383
See application file for complete search history.

(56) References Cited

U.S. PATENT DOCUMENTS

| | | | | |
|---|---|---|---|---|
| 6,550,351 | B1* | 4/2003 | O'Reilly | F16H 59/105 74/335 |
| 7,367,315 | B2* | 5/2008 | Wayama | F02D 9/105 123/361 |
| 2010/0256880 | A1* | 10/2010 | Sato | F16H 59/105 701/55 |
| 2013/0175963 | A1* | 7/2013 | Yamada | H02P 3/08 318/468 |

* cited by examiner

ACTUATOR FOR SHIFT BY WIRE AUTOMATIC TRANSMISSION

CROSS REFERENCE TO RELATED APPLICATIONS

This application is based on and claims priority under 35 U.S.C. § 119 to Japanese Patent Application 2016-225186, filed on Nov. 18, 2016, the entire contents of which are incorporated herein by reference.

TECHNICAL FIELD

This disclosure relates to an actuator for rotating a control shaft in a shift by wire automatic transmission.

BACKGROUND DISCUSSION

In the related art, for example, a shift by wire automatic transmission disclosed in JP 2008-223813A (Reference 1) is known. The shift by wire automatic transmission in the related art includes a position sensor attached to one end portion of a control shaft, an actuator which rotationally drives the control shaft, and a U-shaped member which avoids interfering with the position sensor and connects an output shaft of the actuator to the control shaft.

However, the shift by wire automatic transmission in the related art needs a U-shaped member for connecting an actuator to a control shaft by avoiding a position sensor. In this case, the assembly work for fixing the U-shaped member to the control shaft so as to be incapable of relative rotation is complicated, and it takes time to perform the assembly work. In addition, a space for providing the U-shaped member in an automatic transmission is required, and the automatic transmission itself increases in size.

Thus, a need exists for an actuator for a shift by wire automatic transmission which is not susceptible to the drawback mentioned above.

SUMMARY

An actuator for a shift by wire automatic transmission according to an aspect of this disclosure is applied to a shift by wire automatic transmission that operates in response to an electric signal that is output in accordance with an operation state of an operation member and that performs switching to a selected shift range, and which rotates a control shaft that is provided in the automatic transmission around an axis line. The actuator includes a case that includes an insertion hole through which the control shaft is inserted; a motor that is contained in the case and generates a driving force; a pair of gears that are contained in the case and transmits the driving force of the motor to the control shaft; and an output shaft that is disposed coaxially with the insertion hole between the pair of gears and the control shaft in the case, and the output shaft allows the control shaft to be inserted through the output shaft such that the control shaft is movable in a direction of the axis line and is rotatable about the axis line integrally with the output shaft.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
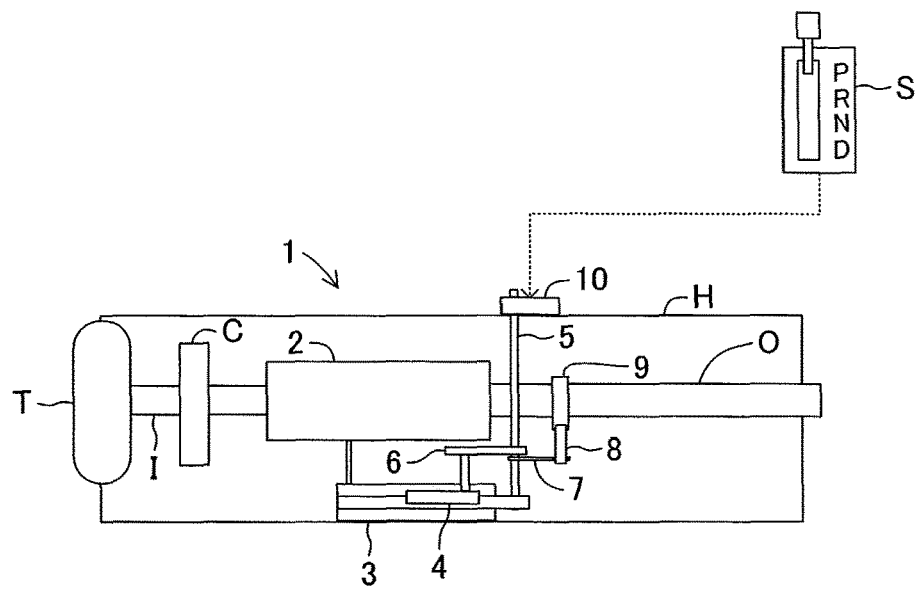
FIG. 1 is a view illustrating a configuration of a shift by wire automatic transmission.

Hereinafter, embodiments of the present disclosure will be described with reference to the drawings. Meanwhile, in the following embodiments and modifications, the same or equivalent portions are denoted by the same reference numerals or symbols in the drawings. In addition, each figure used for description is a conceptual view, and a shape of each portion is not necessarily rigid in some cases.

First, an automatic transmission 1 including an actuator 10 according to the present embodiment will be described. As illustrated in FIG. 1, the automatic transmission 1 is a shift by wire automatic transmission which operates in response to an electric signal output in accordance with an operation state of a shift lever (or a shift switch) S that is an operation member, and is switched to a selected shift range. In the automatic transmission 1, rotation of a crankshaft (not illustrated) of an engine which is a drive source is input to an input shaft I through a torque converter T. The rotation input to the input shaft I is shifted to an appropriate shift ratio by a transmission mechanism portion 2 and is output from an output shaft O.

For example, the transmission mechanism portion 2 is configured by a plurality of planetary mechanisms and has a plurality of stages. Meanwhile, the transmission mechanism portion 2 may have any structure, and may be configured by, for example, a gear mechanism having a plurality of gears, a continuously variable transmission mechanism (CVT), or the like.

The transmission mechanism portion 2 is connected to a hydraulic control device 3. The hydraulic control device 3 controls a shift operation of the transmission mechanism portion 2, and includes at least various kinds of brakes used for the transmission mechanism portion 2, a plurality of linear solenoid valves which controls an engagement operation of a clutch, and a manual valve 4 which supplies hydraulic oil to each linear solenoid valve as required, while not illustrated in detail. A valve body configuring the hydraulic control device 3 is formed of a plurality of layers and is fixed to a lower portion of a housing H of the automatic transmission 1.

The manual valve 4 supplies hydraulic oil from an appropriate port to an appropriate linear solenoid valve in order to establish a shift range, that is, a parking range P, a reverse range R, a neutral range N or a drive range D, respectively, in accordance with selection by the shift lever S. The manual valve 4 is, for example, a spool valve, and the parking range P, the reverse range R, the neutral range N, and the drive range D are established by displacing the spool along an axis line of the manual valve 4 and positioning to a predetermined position.

Figure 2:
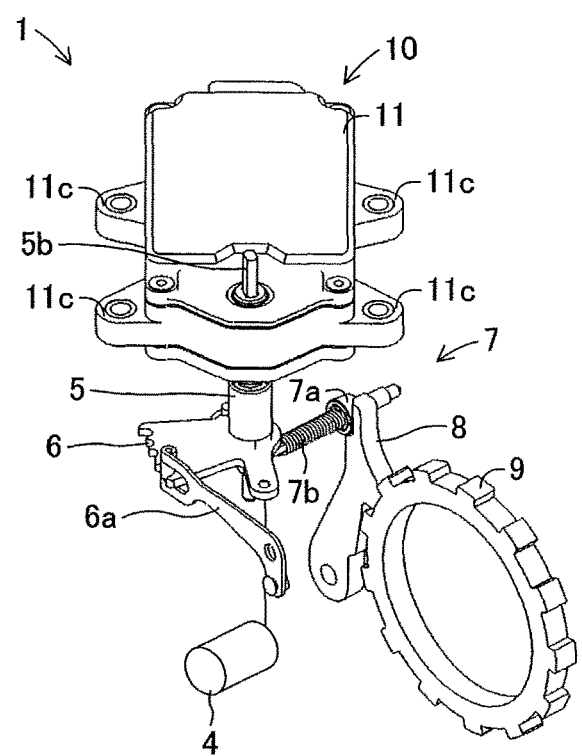
FIG. 2 is a perspective view illustrating a connection of a manual valve, a control shaft, a detent lever, a parking rod, and an actuator in FIG. 1.

The manual valve 4 is connected to a detent lever 6 which rotates integrally with a control shaft 5 provided so as to be rotatable around an axis line with respect to the housing H. As illustrated in FIG. 2, the control shaft (manual shaft) 5 is assembled to an actuator 10 which will be described below on a tip side. Thereby, the control shaft 5 rotates around the axis line in accordance with a driving force generated by the actuator 10.

The detent lever 6 is linked to the shift range (the parking range P, the reverse range R, the neutral range N, the drive range D) selected by the shift lever S, and rotates to, for example, four positions as illustrated in FIG. 2. The detent lever 6 rotates integrally with the rotation of the control shaft 5 to displace the spool of the manual valve 4 in a direction of the axis line in accordance with a rotation position, thereby, changing a state of the manual valve 4. An outer shape of the detent lever 6 is formed in a substantially fan shape, and the detent lever 6 is fixed to a base end side of the control shaft 5. In the detent lever 6, four recessed portions corresponding to each of the four shift ranges (the parking range P, the reverse range R, the neutral range N, and the drive range D) are formed on the tip side. In addition, a detent spring 6a is engaged with a recess portion of the detent lever 6. The detent spring 6a provides a detent force for positioning a rotational position of the detent lever 6 (control shaft 5).

A parking rod 7 is connected to the detent lever 6. The parking rod 7 is displaced in the direction of the axis line in accordance with the rotation of the detent lever 6 (the control shaft 5), and an engagement member 7a provided on the tip side is engaged with a parking lock pole 8. The engagement member 7a is energized in a tip direction in a direction of the axis line of the parking rod 7 by a spring 7b. As illustrates in FIGS. 1 and 2, the parking lock pole 8 is engaged with and disengaged from a ring gear 9 integrally fixed to an output shaft O. The parking lock pole 8 is provided so as to freely tilt by using one end as a fulcrum, and is pressed in a direction of the ring gear 9 to be engaged with the ring gear 9 if the parking rod 7 advances in a direction of the axis line in correspondence with a parking range P (a position illustrated in FIG. 2). The parking lock pole 8 is maintained in an engaged state (locked state) by the engagement member 7a which is provided in the parking rod 7 and is energized in the tip direction by the spring 7b. Meanwhile, the parking lock pole 8 is constantly energized in a direction separated from the ring gear 9 by a spring not illustrated or the like. Accordingly, if the parking rod 7 moves backward in a direction of the axis line in correspondence with a shift range other than the parking range P and the engagement with the engagement member 7a is released, the engagement with the ring gear 9 is released by an energizing force of the spring of the parking lock pole 8.

Figure 3:
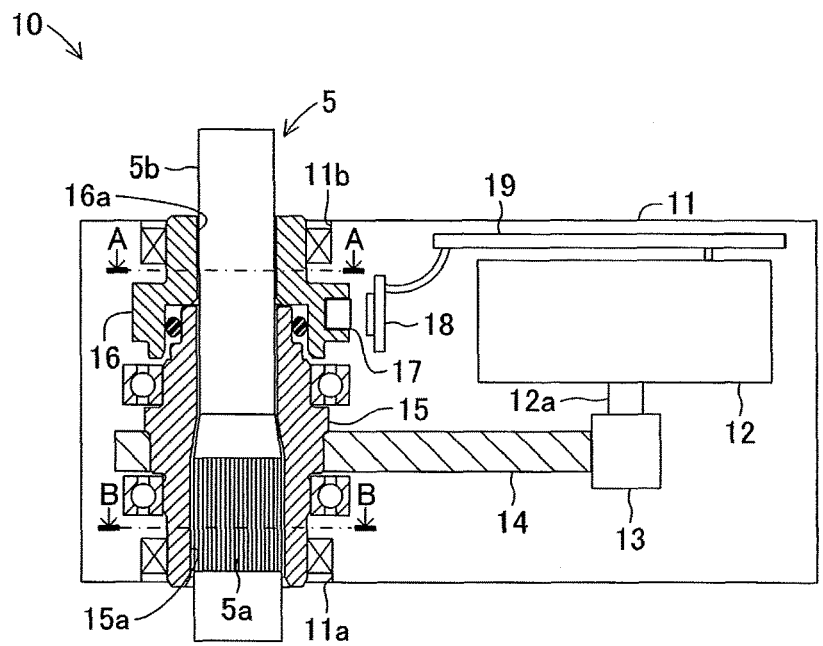
FIG. 3 is a sectional view illustrating a configuration of the actuator of FIG. 2.

As illustrated in FIG. 3, the actuator 10 includes a case 11. The case 11 has an insertion hole 11a through which the control shaft 5 is inserted into the case 11. In addition, the case 11 has an insertion through-hole 11b which is provided coaxially with the insertion hole 11a and which allows a tip of the control shaft 5 inserted from the insertion hole 11a to be inserted such that the tip protrudes outside the case 11. Furthermore, as illustrated in FIG. 2, the case 11 is provided with an attachment portion 11c for fixing the case to the outer peripheral portion of the housing H of the automatic transmission 1.

Figure 4:
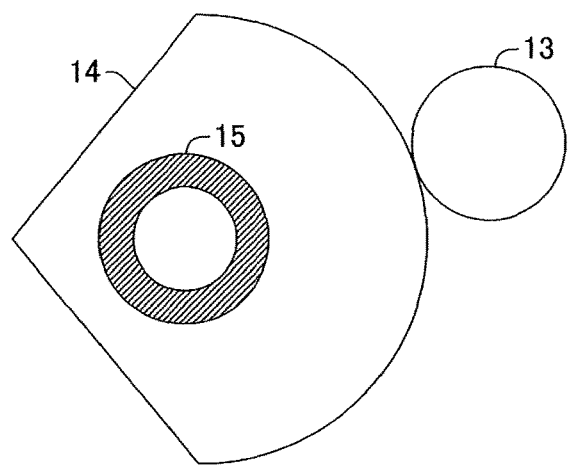
FIG. 4 is a view illustrating a configuration of a pinion gear and an output gear in FIG. 3.

A motor 12 which generates a driving force is contained in the case 11. The driving force of the motor 12 is output to a pinion gear 13 through a motor shaft 12a. The pinion gear 13 meshes with an output gear 14. As illustrated in FIG. 4, the output gear 14 is formed in a substantially fan shape, and the output gear 14 is assembled and fixed such that the base end side is incapable of relative rotation with respect to the output shaft 15. Meanwhile, in FIG. 4, for the sake of easy understanding, tooth surfaces of the pinion gear 13 and the output gear 14 are denoted by simple lines.

Figure 5:
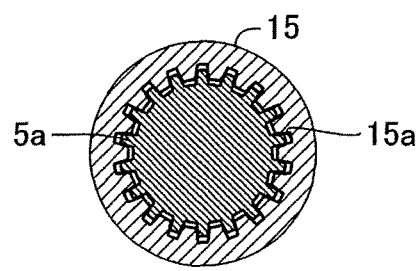
FIG. 5 is a sectional view illustrating an engagement between a spline portion of the control shaft and a spline hole of an output shaft in FIG. 3.

The output shaft 15 is contained in the case 11 and is provided so as to be rotatable with respect to the case 11. The output shaft 15 is provided coaxially with the insertion hole 11a of the case 11, and the control shaft 5 is inserted through the output shaft 15. Meanwhile, a dust seal is provided between the insertion hole 11a and the output shaft 15. The output shaft 15 transmits the driving force of the motor 12, which is transmitted through a pair of gears including the pinion gear 13 and the output gear 14, to the control shaft 5. Accordingly, the output shaft 15 is formed of, for example, a metal material. In addition, a part of an inner peripheral portion of the output shaft 15 is configured with a spline hole 15a such that the control shaft 5 is inserted to be movable in a direction of the axis line, and to be rotatable about the axis line integrally with the output shaft 15, as illustrated in FIG. 5. Corresponding to the spline hole 15a of the output shaft 15, a spline portion 5a is provided on the outer peripheral portion of the control shaft 5 so as to engage with the spline hole 15a. Here, in engagement between the spline hole 15a and the spline portion 5a, the spline hole and the spline portion engage with each other with a gap in a rotation direction.

A sensor holder 16 is contained in the case 11. As illustrated in FIG. 3, the sensor holder 16 is disposed coaxially with the output shaft 15, that is, disposed coaxially with the insertion hole 11a of the case 11, and is connected to the output shaft 15 through a seal member in a direction of the axis line. Meanwhile, a dust seal is provided between the insertion through-hole 11b and the sensor holder 16. The sensor holder 16 is fitted with the control shaft 5 inserted from the insertion hole 11a.

Figure 6:
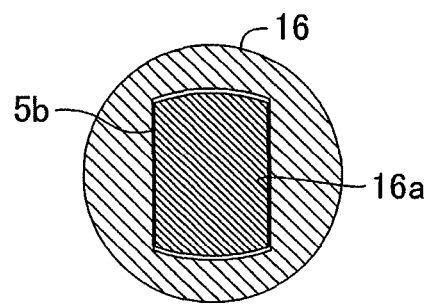
FIG. 6 is a view illustrating fitting of a two-surface width portion of the control shaft and a through-hole of a sensor holder in FIG. 3.

The sensor holder 16 is formed of, for example, a resin material and rotates integrally with the control shaft 5 around the axis line. Accordingly, as illustrated in FIG. 6, the sensor holder 16 is provided with a through-hole 16a having a two-surface width, that is, a two-surface width configuration, as at least one flat surface in the inner peripheral portion. Corresponding to the through-hole 16a of the sensor holder 16, a two-surface width portion 5b is provided as an engagement flat surface on a tip side of the control shaft 5 so as to correspond to the two-surface width of the through-hole 16a. Meanwhile, an interplane distance of the two-surface width portion 5b provided in the control shaft 5 is slightly larger than an interplane distance of the through-hole 16a. Thereby, in a case where the two-surface width portion 5b of the control shaft 5 is inserted through the through-hole 16a, the two-surface width portion 5b is pressed to be inserted while the two-surface width of the through-hole 16a is slightly pressed to be expanded, and is engaged with the through-hole 16a.

In addition, the sensor holder 16 is assembled with a sensor magnet 17 which is contained in the case 11 and configures a sensor for detecting a shift position. The sensor magnet 17 is provided so as to face a position sensor 18 which is contained in the case 11 and configures a sensor for detecting the shift position. The position sensor 18 is connected to a control board 19 contained in the case 11. The control board 19 receives information indicating a shift position detected by the position sensor 18, and drives the motor 12 on the basis of the received information.

The control shaft 5 is assembled to the automatic transmission 1, that is, in a state where the detent lever 6 and the parking rod 7 are assembled to the control shaft 5, the actuator 10 configured as described above is assembled with the control shaft 5. Specifically, the actuator 10 is assembled with the control shaft 5 protruding from the housing H of the automatic transmission 1 to the spline portion 5a. In this case, the control shaft 5 is assembled such that, for example, a rotational position (shift position) of the detent lever 6 (control shaft 5) becomes the parking range P, in the automatic transmission 1.

When the actuator 10 is assembled, a tip side of the control shaft 5 is first inserted through the insertion hole 11a provided in the case 11. At this time, it is possible to confirm a direction of the two-surface width provided in the through-hole 16a of the sensor holder 16 through the insertion through-hole 11b. Thus, the control shaft 5 is inserted through the insertion hole 11a by aligning a direction of the two-surface width portion 5b provided at the tip of the control shaft 5 with a direction of the two-surface width of the through-hole 16a of the sensor holder 16.

If the actuator 10 is moved toward the housing H, the two-surface width portion 5b of the control shaft 5 is engaged with the through-hole 16a of the sensor holder 16, and if the actuator 10 is further moved toward the housing H, the spline portion 5a of the control shaft 5 and the spline hole 15a of the output shaft 15 are engaged with each other. If the actuator 10 comes into contact with the outer peripheral portion of the housing H, the tip of the control shaft 5, that is, the two-surface width portion 5b protrudes from the insertion through-hole 11b of the case 11 as illustrated in FIGS. 1 and 2. In this state, the attachment portion 11c of the case 11 is fastened to the housing H of the automatic transmission 1 by, for example, bolts, and thereby, assembly of the actuator 10 is completed.

As described above, in the actuator 10 assembled with the automatic transmission 1, the sensor magnet 17 held by the sensor holder 16 is already at a rotational position corresponding to the parking range P, and the position sensor 18 outputs information indicating the parking range P to the control board 19. In addition, if the shift range is selected by the shift lever S during a confirmation operation or the like, an electric signal is transmitted to the control board 19. The control board 19 drives the motor 12 so as to achieve the selected shift range in response to the transmitted electric signal. Thereby, a driving force of the motor 12 is transmitted to the output shaft 15 through the pinion gear 13 and the output gear 14, and is transmitted from the output shaft 15 to the control shaft 5 through the spline hole 15a and the spline portion 5a which are engaged with each other. Accordingly, the control shaft 5 rotates around the axis line in accordance with the driving force transmitted from the motor 12, and rotates the detent lever 6 to a position corresponding to the selected shift range. Thereby, a spool of the manual valve 4 and the parking rod 7 are displaced, and the selected shift range is realized. In addition, as the control shaft 5 rotates, the sensor holder 16 rotates integrally with the control shaft 5 without causing relative rotation (so-called, without causing rattling). Thus, the position sensor 18 detects a rotational position of the sensor magnet 17 rotated integrally with the sensor holder 16, that is, detects a shift range, and outputs information to the control board 19.

As can be understood from the above description, the actuator 10 for a shift by wire transmission according to the above embodiment is an actuator for a shift by wire automatic transmission that is applied to the shift by wire automatic transmission 1 which operates in response to an electric signal that is output in accordance with an operation state of the shift lever S which is an operation member and which performs switching to a selected shift range, and that rotates the control shaft 5 which is provided in the automatic transmission 1 around an axis line, and includes the case 11 that includes the insertion hole 11a through which the control shaft 5 is inserted, the motor 12 that is contained in the case 11 and generates a driving force, the pinion gear 13 and the output gear 14 which are a pair of gears that are contained in the case 11 and transmits the driving force of the motor 12 to the control shaft 5, and the output shaft 15 which is disposed coaxially with the insertion hole 11a between the output gear 14 and the control shaft 5 in the case 11 and allows the control shaft 5 to be movable in a direction of the axis line, and through which the control shaft 5 is inserted so as to be integrally rotatable around the axis line.

According to the actuator 10 according to the above embodiment, by inserting the control shaft 5, the output shaft 15 can be assembled with the control shaft 5 around the axis line so as to be integrally rotatable. Thereby, the driving force of the motor 12 can be transmitted to the control shaft 5. Accordingly, the work for connecting the control shaft 5 to the motor 12 is not required, and the actuator 10 can be very easily assembled with the automatic transmission 1. In addition, since the control shaft 5 and the motor 12 can be directly connected to each other without using a connection member different from the actuator 10, it is possible to achieve miniaturization of the automatic transmission 1. In addition, since the control shaft 5 and the motor 12 can be directly connected to each other without connecting the control shaft 5 to the motor 12 by using, for example, a tool as the actuator 10 is assembled with the housing H of the automatic transmission 1, it is possible to reduce a time necessary for assembly work.

In addition, in this case, the actuator 10 includes the sensor magnet 17 which is disposed coaxially with the output shaft 15 in the case 11, is fitted with the control shaft 5 to rotate integrally with the control shaft 5 around the axis line, and is contained in the case 11 and configures a sensor for detecting a shift range of the automatic transmission 1, and the sensor holder 16 which holds the sensor magnet 17 out of the position sensor 18.

According to this, the sensor magnet 17 and the position sensor 18 are contained in the case 11. Thereby, there is no need to provide a space for providing the sensor magnet 17 and the position sensor 18, for example, in an outer peripheral portion or in an inner portion of the automatic transmission 1, and it is possible to achieve miniaturization of the automatic transmission 1 itself. In addition, by holding the sensor magnet 17 in the sensor holder 16 fitted with the control shaft 5, a rotational position of the sensor magnet 17 need not be adjusted with respect to the position sensor 18, and as a result, it is possible to greatly reduce an assembly time. Thus, only by assembling the actuator 10 with the automatic transmission 1, the driving force of the motor 12 can be transmitted to the control shaft 5, and the position sensor 18 can accurately detect the shift range.

In addition, by inserting the control shaft 5 to assemble the actuator 10, the sensor holder 16 can be fit so as to rotate integrally with the control shaft 5 around the axis line. Thus, an operation for connecting the control shaft 5 to the sensor holder 16 is not required. As a result, the assembly work can be performed very easily, and thereby, it is possible to improve workability and to reduce a work time associated with the assembly work.

In this case, the case 11 has the insertion through-hole 11b which is provided coaxially with the insertion hole 11a and through which the control shaft 5 is inserted from the insertion hole 11a into the case 11 such that a tip of the control shaft 5 protrudes outward the case 11, and the control shaft 5 is provided with the two-surface width portion 5b having a two-surface width, that is, a two-surface width configuration, at a tip thereof.

According to this, the two-surface width portion 5b can be provided at the tip of the control shaft 5 which protrudes from the insertion through-hole 11b of the case 11. Thereby, for example, even in a case where a power failure occurs in a vehicle, it is possible to rotate the control shaft 5 from the outside by using a general tool. Thereby, for example, when a vehicle is repaired, it is possible to easily change a shift range of the automatic transmission 1 manually at the time of pulling the vehicle, and to improve workability.

In this case, the output shaft 15 is provided with a spline hole 15a in which the control shaft 5 is movable in a direction of the axis line and through which the control shaft 5 is inserted so as to be integrally rotatable around the axis line, and the control shaft 5 is provided with the spline portion 5a engaged with the spline hole 15a of the output shaft 15.

According to this, a driving force of the motor 12 can be transmitted to the control shaft 5 by performing spline engagement of the control shaft 5 and the output shaft 15. Thus, it is possible to transmit the driving force of the motor 12 to the control shaft 5 very easily and reliably. In addition, since the control shaft 5 can be inserted through the output shaft 15, it is possible to reduce assembly time and to improve workability.

In addition, In this case, the sensor holder 16 is provided with the through-hole 16a through which the control shaft 5 is inserted and which has a two-surface width as at least one flat surface in an inner peripheral portion, and the control shaft 5 is provided with the two-surface width portion 5b as an engagement flat surface fitted by press with a two-surface width provided in the through-hole 16a of the sensor holder 16 in an outer peripheral portion.

According to this, the sensor holder 16 rotates integrally with the control shaft 5 by fitting the two-surface width of the through-hole 16a with the two-surface width of the two-surface width portion 5b of the control shaft 5 by press. Thus, it is possible to very easily rotate the sensor holder 16 integrally with rotation of the control shaft 5 without causing relative rotation (without causing rattling). Thereby, the sensor magnet 17 held by the sensor holder 16 rotates to a rotational position very accurately corresponding to a shift range, and thus, the position sensor 18 can detect the shift range very accurately.

Modification Example of Aforementioned Embodiment

Figure 7:
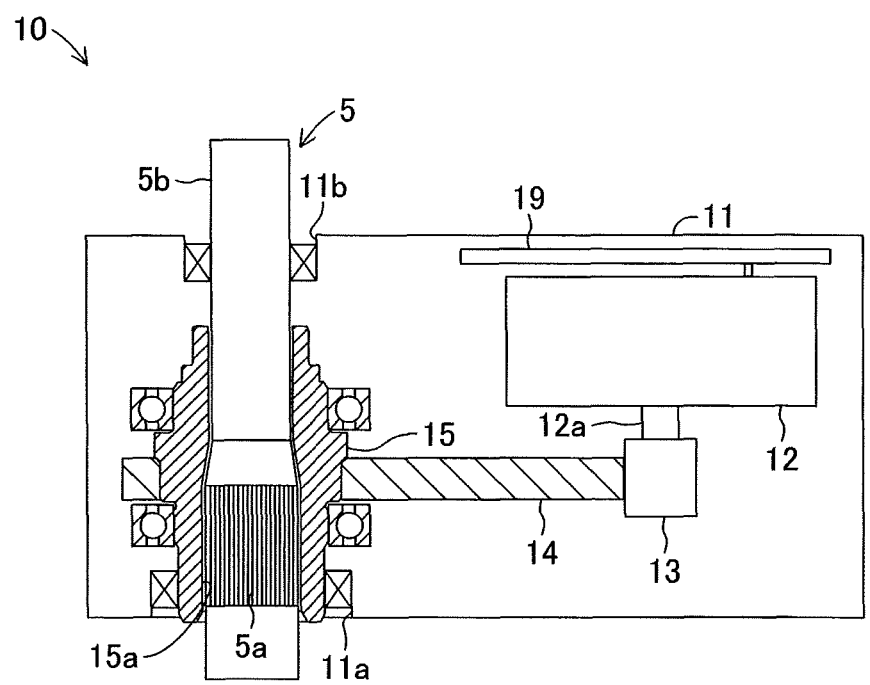
FIG. 7 is a view illustrating a configuration of an actuator according to a modification example of an embodiment.

In the aforementioned embodiment, the case 11 contains the output shaft 15 and the sensor holder 16 which are coaxial with the insertion hole 11a provided in the case 11. In this case, the sensor holder 16 can also be omitted, for example, according to the specification of the automatic transmission 1 as illustrated in FIG. 7. As such, even in a case where the sensor holder 16 is omitted, the spline hole 15a of the output shaft 15 and the spline portion 5a of the control shaft 5 can be engaged with each other only by assembling the actuator 10 with the housing H of the automatic transmission 1 by inserting the control shaft 5 therethrough with respect to the output shaft 15.

Thus, work which uses a tool for connecting the control shaft 5 to the motor 12 is not required in the same manner as the aforementioned embodiment. As a result, since the assembly work can be performed very easily, it is possible to improve workability and to reduce work time associated with the assembly work.

The present disclosure is not limited to the aforementioned embodiment, and various modification examples may be adopted without departing from the object of the present disclosure.

For example, in the aforementioned embodiment, the output gear 14 is assembled with the output shaft 15 so as to rotate integrally. In contrast to this, it is also possible to integrally form the output gear 14 and the output shaft 15. Also in this case, since the driving force of the motor 12 can be transmitted to the control shaft 5 through the output shaft 15, it is possible to obtain the same effects as the aforementioned embodiment, and in addition to this, it is possible to omit work for assembling the output gear 14 with the output shaft 15.

In addition, In the aforementioned embodiment, a two-surface width is provided in the through-hole 16a of the sensor holder 16, and a two-surface width fitted (pressed to be inserted) with the control shaft 5 in correspondence with the two-surface width of the through-hole 16a is provided on the control shaft 5. In this case, for example, it is also possible to provide one flat surface in the through-hole 16a of the sensor holder 16, to provide one flat surface corresponding to the one flat surface of the through-hole 16a in the control shaft 5, and to fix the control shaft 5 to the through-hole 16a of the sensor holder 16 by a screw or the like in a state where the control shaft 5 is inserted through the through-hole 16a.

Alternatively, it is also possible to provide three or more flat surfaces in the through-hole 16a of the sensor holder 16, and to provide three or more flat surfaces which are fitted (pressed to be inserted) with the control shaft 5 in correspondence with three or more flat surfaces of the through-hole 16a. Furthermore, it is also possible to provide a recess in the through-hole 16a of the sensor holder 16 and to provide a projection portion fitted (pressed to be inserted) with the control shaft 5 in correspondence with the recess of the through-hole 16a.

Also in this case, since the sensor holder 16 can be assembled with the control shaft 5 so as to be incapable of relative rotation, the sensor magnet 17 held by the sensor holder 16 can be reliably made to coincide with rotation of the control shaft 5. Thus, the position sensor 18 can accurately detect a rotational position of the detent lever 6 which rotates integrally with the control shaft 5, that is, a shift range.

In addition, in the aforementioned embodiment, the case 11 is provided with the insertion through-hole 11b and the two-surface width portion 5b provided at the tip of the control shaft 5 protrudes. In this case, it is also possible not to provide the insertion through-hole 11b of the case 11, and it is possible to form the tip of the control shaft 5 so as not to protrude from the case 11. In addition, in the aforementioned embodiment, the control board 19 is contained in the case 11. In this case, it is also possible to provide the control board 19 outside the case 11.

Furthermore, in the aforementioned embodiment, the actuator 10 is applied to the automatic transmission 1 having the parking range P, the reverse range R, the neutral range N, and the drive range D. However, it is also possible to apply the actuator 10 to an automatic transmission (of a so-called PnotP type) that switches between the parking range P and another shift range like, for example, a hybrid vehicle.

An actuator for a shift by wire automatic transmission according to an aspect of this disclosure is applied to a shift by wire automatic transmission that operates in response to an electric signal that is output in accordance with an operation state of an operation member and that performs switching to a selected shift range, and which rotates a control shaft that is provided in the automatic transmission around an axis line. The actuator includes a case that includes an insertion hole through which the control shaft is inserted; a motor that is contained in the case and generates a driving force; a pair of gears that are contained in the case and transmits the driving force of the motor to the control shaft; and an output shaft that is disposed coaxially with the insertion hole between the pair of gears and the control shaft in the case and allows the control shaft to be inserted movably in a direction of the axis line and to be inserted integrally and rotatably around the axis line.

According to this configuration, by inserting a control shaft, an output shaft can be assembled with the control shaft around an axis line so as to be integrally rotatable. Thereby, a driving force of a motor can be transmitted to the control shaft. Accordingly, work for connecting the control shaft to the motor is not required, and an actuator can be very easily assembled with an automatic transmission. In addition, since the control shaft and the motor can be directly connected to each other without using a connection member different from the actuator, it is possible to achieve miniaturization of the automatic transmission.

The actuator according to the aspect of this disclosure may further include a sensor holder that is disposed coaxially with the output shaft in the case, is fitted with the control shaft to rotate integrally with the control shaft around the axis line, and holds a sensor which is contained in the case and detects the shift range of the automatic transmission.

In the actuator according to the aspect of this disclosure, the case may include an insertion through-hole which is provided coaxially with the insertion hole and which allows a tip of the control shaft inserted from the insertion hole to be inserted such that the tip protrudes outside the case, and the control shaft may be provided with a two-surface width portion having a two-surface width at the tip.

In the actuator according to the aspect of this disclosure, the output shaft may be provided with a spline hole which allows the control shaft to be movable in a direction of the axis line and to be integrally rotatable around the axis line, and the control shaft has a spline portion that is engaged with the spline hole of the output shaft.

In the actuator according to the aspect of this disclosure, the sensor holder may be provided with a through-hole through which the control shaft is inserted and which has at least one flat surface in an inner peripheral portion, and the control shaft is provided with an engagement flat surface that is fitted with the flat surface which is provided in the through-hole of the sensor holder in an outer peripheral portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An actuator for a shift by wire automatic transmission, which is applied to a shift by wire automatic transmission that operates in response to an electric signal that is output in accordance with an operation state of an operation member and that performs switching to a selected shift range, and which rotates a control shaft that is provided in the automatic transmission about an axis line, the actuator comprising:
   a case that includes an insertion hole through which the control shaft is inserted;
   a motor that is contained in the case and generates a driving force;
   a pair of gears that are contained in the case and transmits the driving force of the motor to the control shaft;
   an output shaft that is disposed coaxially with the insertion hole between the pair of gears and the control shaft in the case, a spline hole provided in the output shaft being engaged with a spline portion provided on an outer peripheral portion of the control shaft with a gap in a rotation direction, such that the control shaft is movable in a direction of the axis line relative to the output shaft and is rotatable about the axis line integrally with the output shaft; and
   a sensor holder that is disposed coaxially with the output shaft in the case, a through-hole of the sensor holder defining a two-surface width portion having an engagement flat surface, said engagement flat surface being engaged with an engagement flat surface of a two-surface width portion on a tip side of the control shaft so that the sensor holder rotates integrally with the control shaft around the axis line, the sensor holder holding a sensor which is contained in the case and detects the shift range of the automatic transmission,
   wherein the tip side of the control shaft is pressed to be inserted through the through-hole of the sensor holder.

2. The actuator for a shift by wire automatic transmission according to claim 1,
   wherein the case includes an insertion through-hole which is provided coaxially with the insertion hole and which allows a tip of the tip side of control shaft inserted from the insertion hole to be inserted such that the tip protrudes outside the case.

3. The actuator for a shift by wire automatic transmission according to claim 1, wherein the output shaft is formed of a metal material and the sensor holder is formed of a resin material.

* * * * *